Nov. 4, 1941.  G. ELVERSTON  2,261,494
AUTOMATIC CONTROL FOR WASHING, DRY-CLEANING,
BLEACHING, DYEING, AND THE LIKE MACHINES
Filed April 17, 1939  4 Sheets-Sheet 4

Inventor.
Gilbert Elverton
per Ferdinand Broster Bosshardt
Attorney.

Patented Nov. 4, 1941

2,261,494

UNITED STATES PATENT OFFICE 2,261,494

AUTOMATIC CONTROL FOR WASHING, DRY-CLEANING, BLEACHING, DYEING, AND THE LIKE MACHINES

Gilbert Elverston, Gatley, England

Application April 17, 1939, Serial No. 268,350
In Great Britain May 6, 1938

4 Claims. (Cl. 137—68)

Hitherto in automatic controls for washing, dry-cleaning, bleaching, dyeing and the like machines, wherein valves controlling the supply and discharge of various liquids used in the process for which the machine is employed are actuated automatically at predetermined times by means of a fluid under pressure, accidental variations affecting the supply rate are not allowed for and consequently the supplied volume of liquids is not constant.

Another known automatic control allows for variations affecting the supply rate of the said liquids and the supplied volume of liquid is constant, but the control is operated electrically and is complicated and costly. Another known electrically operated automatic control, although comparatively simple in construction is costly to produce and does not allow for variations affecting the supply.

Another known automatic control is driven mechanically but it cannot readily be adjusted to vary the process and is complicated and costly and does not always supply the liquids in the correct order.

The object of my invention is to provide a novel construction of automatic control which, whilst less costly to produce and operated by one of the fluids available in every laundry, enables all the liquids to be controlled, enables the order and periods of the stages in the process to be varied easily and if desired to be quickly changed and also ensures uniform charges of the liquids.

According to the invention, the automatic control comprises a master member rotated at a uniform speed in combination with a control member oscillated by means of a float, the two members acting on control valves which control the supply of fluid under pressure to pistons or the equivalent which operate main valves through which the liquids and, if necessary steam, are supplied to the machine and the liquids are discharged therefrom.

The master member may effect the discharge of the liquids and the control member may control a supply of hot water, or cold water, or a solution or any other required liquid, or two or more of these, to the machine.

The said fluid under pressure may be water or compressed air. Compressed air is required in laundries for other purposes, and a supply thereof is therefore usually available in every laundry.

The control valves may be operated by cams mounted circularly adjustably on the control members.

The cams on the control member are displaced axially and the control member is shifted axially stepwise to bring different cams into operation on the liquid control valves at each stage in the process.

There may be two or three preadjusted sets of cams for performance of a different process by each set when brought into operation whereby the action of the control valves can be changed and therefore the process can be changed quickly.

I attain the hereinbefore stated object by the mechanism illustrated in the accompanying drawings, wherein—

Figure 3:
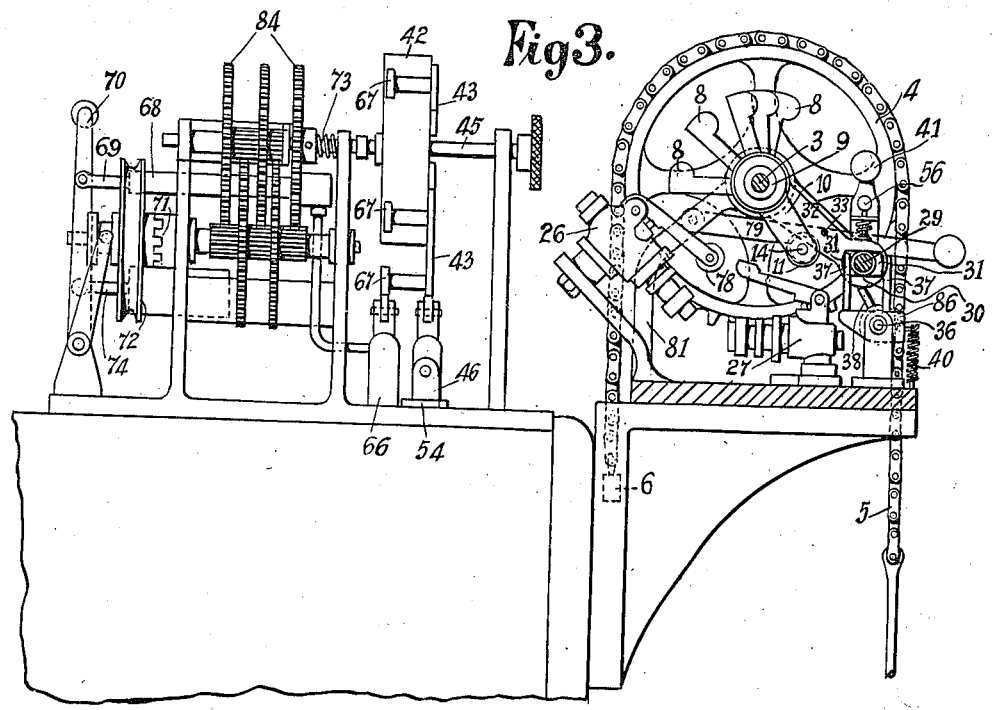

Figure 3 a fragmentary rear view, partly in section, thereof.

Figure 4:
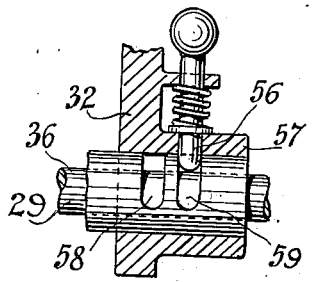

Figure 4 is a detached fragmentary side view in section drawn to a larger scale.

Figure 5:
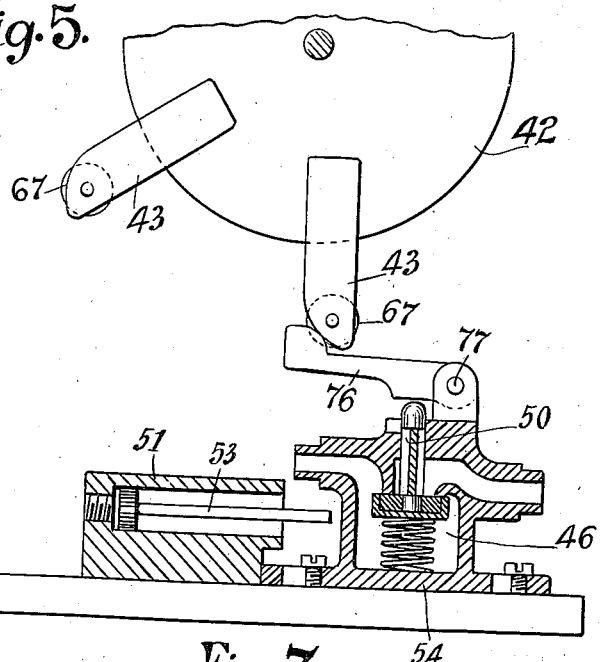

Figure 5 is a detached fragmentary side view in section.

Figure 6 is a detached side view partly in section showing means for opening and closing a water supply valve.

Figure 7:
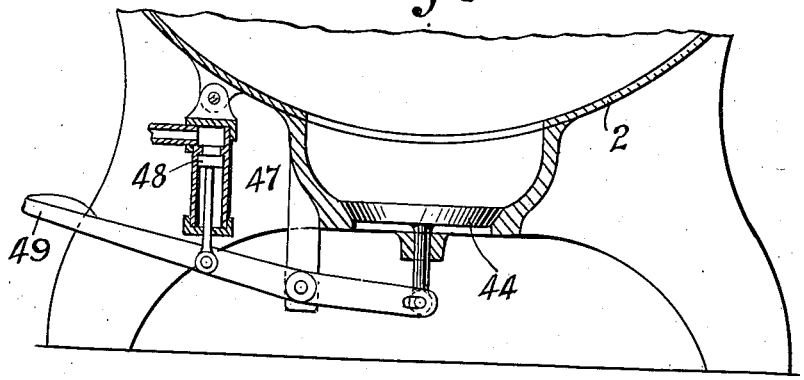

Figure 7 is a detached, fragmentary end view partly in section.

Figure 8 is a diagrammatic view of the connection of the fluid under pressure to the control.

I provide at one end of the washing machine a vertical float cylinder 1 in open communication with the bottom of the washing cylinder 2. Above the cylinder 1 there is a horizontal shaft 3 having a toothed wheel 4 connected by a toothed rack or a chain 5 with counter weight 6 to a float 7. Hot and cold water control cams 8 are mounted on a sleeve 9 which rotates with the shaft 3 but is axially slidable thereon. The cams 8 are each angularly adjustable and fixable in adjusted position on the sleeve 9. The number of cams 8 is equal to the total number of times the hot water valve and the cold water valve have to be closed in performing one complete washing process. For the sake of simplicity only a few of the said cams are shown in the drawings. Two arms 10 are fixed to the sleeve and carry a spindle 14 having valve opening roller cams the number of which equals the total number of times the hot water valve and the cold water valve have to be opened in performing the said complete washing process. The rise of the float 7 rotates the sleeve 9 in the forward direction and the fall of the float 7 causes the sleeve 9 to rotate in the reverse direction. The positions of the cams 8 determine whether they shall operate to close the hot water valve or the cold water valve, or both, and the said cams are slidably adjustable along the sleeve 9 and fixable in the adjusted position. Assuming the employed fluid under pressure is compressed air, two compressed air valves 12 and 13 respectively are provided for controlling the hot water valve. The valves 12 and 13 close automatically. The valve 12 is opened by the cams 8 and the valve 13 by the rollers 11 on the spindle 14. The valve 13 is connected to a pivotally mounted cylinder 15, Figure 6, so that when it is opened it supplies air thereto. The valve 12 is connected to a cylinder 16, so that when opened it supplies compressed air thereto. A piston 17 provided in the cylinder 15, when actuated by the compressed air, operates a hand lever 18 provided on the hot water valve 20 and having a cam surface 19 to open the same, the cam surface being self-sustaining in the closed and open positions of the lever 18. The piston 17 operates on the lever 18 through a piston rod 22 pivotally connected to the lever at 23. A piston 21 provided in the trip cylinder 16, when actuated by the compressed air, pushes by means of its piston rod 24 against a plate 25 provided on the lever 18 and thereby trips the cam surface 19 out of its self-sustaining open position and thereby permits the valve 20 to close itself and return the lever 18, rod 22 and piston 17 to the initial position. Similarly there is a compressed air valve 26, Figures 2 and 3, for effecting closing of the cold water valve, and a compressed air valve 27 for effecting opening of the cold water valve. The valves 26 and 27 are connected to valve operating mechanisms similar to those described with reference to Figure 6 and operating on a cold water valve 28, Figure 8, which is similar to the valve 20 and is therefore not shown in detail, the said mechanisms, when supplied with compressed air, operating to close and open the cold water valve 28. The valves 26 and 27 are operated by different cams 8 and rollers 11 from those operating the valves 12 and 13. The hand lever 18 on the hot water valve and the similar lever on the cold water valve 28 serve to operate the hot and cold water valves at any time by hand to meet an emergency.

The sleeve 9 is slid axially in a stepwise manner to bring successive of the cams 8 and rollers 11 into action on the compressed air valves as required, after or during the forward and reverse oscillations of the sleeve 9.

One suitable mechanism for sliding the sleeve axially between the filling operations involved in a complete washing process is shown in Figures 1 to 4 and comprises a stationary rod 29 on which there is a slidable sleeve 30 having pairs of diametrically opposite lugs 31, the sleeve 30 being coupled to the sleeve 9 by a bracket 32 which allows the sleeve 9 to rotate. A flexible cable 33 is connected to the bracket 32 and runs over a pulley 34 and is furnished with a weight 35 which acts to pull the bracket 32 and therefore the sleeves 9 and 30 towards the pulley 34. This movement is controlled by a pallet 86 mounted on a rock shaft 36 and having axially offset prongs 37 which cooperate with the pairs of lugs 31. The pallet 86 is oscillated in one direction by means of an arm 38 provided on the shaft 36 and depressed by a latch finger 39 on the sprocket wheel 4 adapted to depress and then trip the arm 38 when the sprocket wheel rotates in anti-clockwise direction but pass the said arm without operating it and the shaft 36 when the sprocket wheel rotates in the reverse direction. A tension spring 40 returns the pallet to the initial position after the arm 38 has been tripped. Each depression and tripping of the arm 38 therefore results in the sleeves 9 and 30 being axially displaced a distance equal to that from one pair of lugs 31 to the next, and therefore different cams 8 and rollers 11 come into register with the compressed air valves. To enable the sleeves to be returned to the shown initial position at the end of a complete washing process ready to commence the next washing process, the sleeve 30, which is oscillatable in the bracket 32 is rotated a quarter turn by means of the handle 41 provided thereon so as to bring all its lugs 31 out of register with the prongs 37, whereupon the sleeves can be drawn back into the initial position, against the action of the weight 35. To ensure that the rollers 11 shall not foul the compressed air valve when the sleeve 9 is drawn back, a hand lever 79 is fulcrumed at 80 to a stationary part 81 and, when raised, acts on a lug 82 to turn the sleeves 9 into a position where the path of the rollers 11 is clear of the compressed air valves. A stationary catch bracket 83 is arranged to be engaged by one of the arms 10 when the sleeves are in the final axial position and the roller path coincides with the compressed air valves, thus preventing the sleeves from being drawn back until the lever 79 has been raised.

On the washing machine there is a master disc 42 having a plurality of radial master cams 43 mounted on it preferably in a manner which permits of circular adjustment. The cams 43 serve for opening the discharge valve 44, Figures 1 and 7, of the washing cylinder 2. There is a separate cam 43 for each of the discharges which must take place in a complete washing operation. The master disc 42 is mounted on a shaft 45 driven at a constant, slow speed, for example through reduction gearing 84. A compressed air valve 46 with automatic pressure release is arranged to be opened by the cams 43 and is connected on the one hand to the compressed air supply and on the other hand to a pivotally mounted discharge cylinder 47 containing a piston 48 connected to a lever, for example the usual foot pedal lever 49 which opens the discharge valve 44. The valve 44 closes by gravity. The valve 46, see particularly Figure 5, is adapted when opened by any of the cams 43 to supply compressed air to the discharge cylinder 47 and thereby open the discharge valve 44. When shut, the valve 46 releases the pressure in the discharge cylinder 47 through a slot 50 in the valve spindle and thus allows the discharge valve 44 to close by gravity. To ensure closure of the valve 46 and therefore the discharge valve 44 not later than the moment of opening of the hot and/or cold water valves, the compressed air valves 13 and 27 are also connected to a trip cylinder 51 containing a piston 52 the rod 53 of which acts on the valve 46 to slide it bodily in a linear direction contrary to that of rotation of the master disc 42. The valve 46 is mounted on a slideable base 54 and connected by flexible connections. On the opening of either of the valves 13 and 27, compressed air is supplied to the trip cylinder 51 and causes the rod 53 to abruptly slide the valve 46 away from the cam 43 acting thereon and thus enables the valve 46 to close and therefore allow the discharge valve 44 to close.

A dash pot may be provided to delay the fall of the float 7 at the end of its fall, or the outflow of liquid from the float member 1 may be automatically delayed as the float nears the end of its fall, for the same purpose.

In operation, assuming the washing process to be at the end of a stage where the cylinder 2 contains a charge of liquid, one of the master cams 43 on the rotating master disc 42 opens the compressed air valve 46 which thereupon admits compressed air to the discharge cylinder 47 and thereby opens the discharge valve 44. The compressed air valve 46 is kept open by the cam until the charge of liquid has escaped and the float 7 has fallen. When the cylinder is nearly empty the fall of the float 7 is delayed by the dash pot or other means to ensure complete emptying of the washing cylinder. As the float 7 moves into its lowermost position it opens the compressed air valve 13 or 27, or both, which thereupon supplies compressed air to the trip cylinder 51 and thereby produces immediate closure of the discharge valve 44. The valve 13 or 27, or both, at the same time opens the hot water valve 20 or cold water valve 28, or both, to recharge the cylinder 2. This recharging causes the float 7 to rise and the sleeve 9 to rotate in the reverse direction. This rotation allows the open compressed air valve or valves to close and leaves the compressed air free to escape from the respective opening cylinder of the hot or cold water valve or both. Continued rotation of the sleeve 9 in the said reverse direction causes the closing cams 8, when the desired level of liquid in the washing cylinder 2 has been reached, to open the respective valve 12 or 26 or valves 12 and 26 and thereby cause the trip mechanism of the hot water valve 20 and/or cold water valve 28 to operate to close the said valve or valves either simultaneously or successively. The open compressed air valve or valves remain open until the respective cam or cams no longer act thereon. The float 7 does not start to fall again until the next cam 43 on the master disc operates the discharge valve 44. In the meantime the air has escaped by leakage from the cylinder 51 and the piston 52 and valve 46 have returned under the action of a spring 55, Figure 2, to their initial positions. During the reverse movement of the sleeve 9, the escapement mechanism shifts it axially to bring into operation the next set of opening rollers 11 and closing cams 8 thereon, whereby the next charge of liquid is caused to be different from the preceding one if required or desired.

Figure 2:
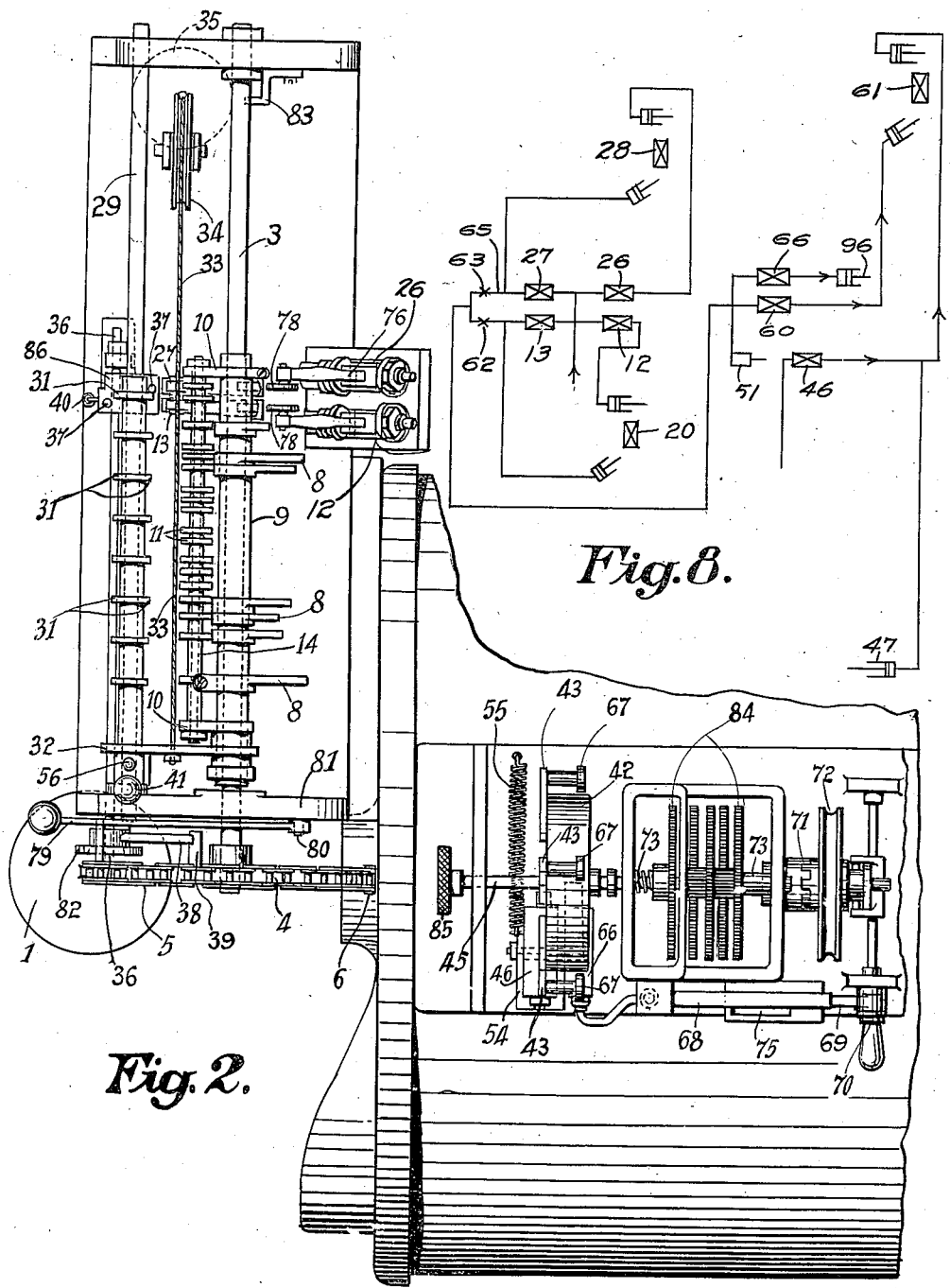
Figure 2 is a plan view.

To enable a quick change over from the charges of liquid used in one complete process to the charges of liquid used in a different complete washing process, additional rollers 11 and cams 8 may be interposed between those provided for the first process and be fixed in adjusted position for the second process, it being then only necessary to displace the bracket 32 and thereby the sleeve 9 axially relative to the sleeve 30 in order to change from the first process to the second. This displacement may be provided for by connecting the bracket 32 to the sleeve 30 by means of a spring loaded slidable pin 56, Figures 2 and 4, provided on a boss 57 on the bracket 32 and adapted to engage either of two peripheral slots 58 and 59 respectively provided in the sleeve 30. By pulling the pin 56 out of one of the slots, for example the slot 59 and sliding the bracket 32 along the sleeve 30 until the pin 56 snaps into the other slot for example the slot 58, the sleeve 9 becomes so displaced that the rollers 11 and cams 8 employed for the one process are no longer in positions where they can register with the valves 12, 13, 26 and 27 but the rollers 11 and cams 8 employed for the other process register successively with the said valves in each successive axial position of the sleeve 30.

The master disc 42 may also be provided with a steam controlling cam or cams adapted to open a compressed air valve 60, Figure 8, which operates to open the steam valve 61 through an opening mechanism similar to the mechanism 15, 17, 22, the steam valve 61 being similar to the hot water valve 20 and having a hand lever with cam surface similar to the hand lever 18. The steam valve 61 is closed by a trip mechanism which is similar to the mechanism 16, 21, 24, 25 and is actuated by a supply of compressed air from the valve 46 when the said valve is opened by the master cams 43, thereby ensuring that the steam shall be shut off at the moment of opening of the discharge valve 44.

Back pressure valves 62 and 63, Figure 8, may be provided in the compressed air connections 64 and 65 between the valves 13 and 27 and the cylinder 51 to prevent flow back of the compressed air, and the compressed air valve 60 may be fed from the connections 64 and 65 so that the steam valve cannot be opened before the liquid supply to the washing cylinder 2 is commenced.

Figure 1:
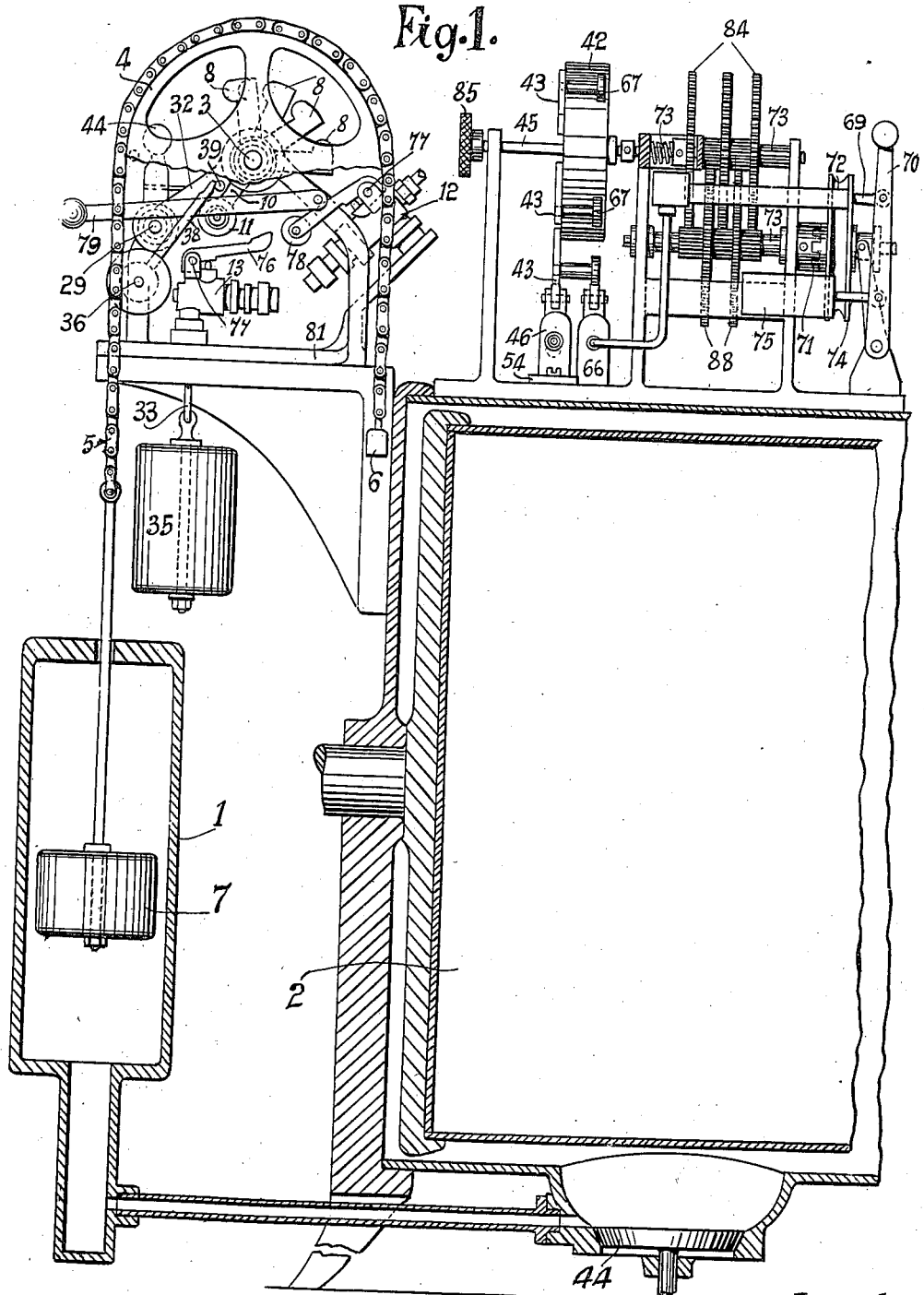
Figure 1 is a fragmentary front view of an automatic control for a washing machine.

In order, when desirable, to stop the further operation of the master disc 42 at the start of any of the charges and ensure that the operative shall give the necessary attention to the process, a compressed air valve 66, Figures 1 and 8, is provided for actuation by a removable projection 67 on the respective cam or cams 43. The valve 66 supplies compressed air to a cylinder 68 having a plunger 69 connected to a hand lever 70 adapted to operate a clutch device 71 to clutch and unclutch a driving pulley 72 or the equivalent from the gear driving shaft 73. The operating member 74 of an electric switch 75 is connected to the hand lever 70. The switch controls a circuit containing a signal bell and/or light.

In operation when the discharge valve has been opened for a suitable time and the projection 67 has opened the valve 66, the rollers 11 open the hot or cold water valve, or both, and compressed air from the valves controlling the hot and/or cold water valve passes through the open valve 66 and thereby causes the plunger 69 to shift the hand lever 70 into the position where it disengages the drive from the disc 42, thereby stopping rotation of the said disc until the lever 70 is operated by hand to re-engage the said drive. The shifting of the lever 70 into the position of disengagement closes the switch 75 and thereby sets the signal light and/or bell in operation. The operator is thus warned that a new charge of liquid is being introduced. The plunger 69 cannot operate until either the valve 13 or 27 or both open, because the supply of compressed air to the valve 66 is controlled by these valves, thus preventing the possibility of premature stoppage of the disc 42.

To reduce the force required to operate the valves 12, 13, 26, 27, 46 and 66 the said valves are actuated through the medium of levers 76 fulcrumed at 77, the levers 76 of the valves 12 and 26 being preferably provided with anti-friction rollers 78 for the respective cams to act on.

Means is preferably provided for temporarily disconnecting the shaft 45 from the reduction gearing and a knob 85 is preferably provided for turning the shaft 45 by hand, all for the purpose of enabling the angular position of the master disc or discs and therefore the cams carried thereby to be changed by the operative for example when restarting the control at the commencement of a new washing process.

I claim:

1. An automatic control for controlling the supply of liquid to washing, dry-cleaning, bleaching, dyeing and like machines, comprising an oscillatory control member, a shaft on which said control member slides for oscillating said control member, a toothed wheel on said shaft for oscillating the same, a rising and falling float for oscillating said toothed wheel by its rise and fall with the liquid level in the machine, liquid supply valves on the machine, opening means operated by fluid under pressure for opening said liquid supply valves, valves controlling the supply of said fluid to said opening means, closure means operated by fluid under pressure for closing said liquid supply valves, valves controlling the supply of said fluid to said closure means, cams on said control member for opening said valves which control the supply of said fluid to said opening means, additional cams on said control member for opening said valves which control the supply of said fluid to said closure means, means operated from said wheel for displacing said control member and cams axially at each oscillation of said wheel in one direction and bringing different of said cams into operation on said valves at each oscillation of said wheel in one direction.

2. An automatic control according to claim 1, comprising axially displaced adjustable cams on said control member and means for shifting said control members stepwise axially and successively bringing different cams into operation on said control valves.

3. An automatic control according to claim 1, comprising a plurality of sets of cams on said control member, escapement means for shifting the said control member stepwise axially and successively bringing different cams of each set separately into operation on said control valves and means for adjusting said control member relative to said escapement means and bringing any desired one of said sets of cams into operation on said control valves.

4. An automatic control for controlling the supply of liquid to washing, dry-cleaning, bleaching, dyeing and like machines, comprising in combination, an oscillatory control member, a float for oscillating the said control member, normally shut control valves opened by said control member, a supply of fluid under pressure controlled by said control valves, main valves on the machine for controlling the supply of liquid to the machine, devices actuated by the said fluid for operating the said main valves, a liquid discharge valve on the machine, a master member for opening said discharge valve, a fluid operated device for closing said discharge valve, a supply of fluid supplying the fluid operated device and controlled by some of said control valves, a drive for driving said master member, a fluid operated disconnecting device for disconnecting said drive from said master member, signal means set in operation by said disconnecting device, and a supply of fluid supplying said disconnecting device and controlled by some of said control valves for disconnecting said drive and operating said signal means when the last named control valves are opened by said oscillatory control member.

GILBERT ELVERSTON.